US008621431B2

(12) United States Patent
Zhao

(10) Patent No.: US 8,621,431 B2
(45) Date of Patent: *Dec. 31, 2013

(54) METHOD TO RECOGNIZE GUI OBJECT IN GLOBALIZED ENVIRONMENT

(75) Inventor: Nai Y. Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 18 days.

This patent is subject to a terminal disclaimer.

(21) Appl. No.: 13/407,724

(22) Filed: Feb. 28, 2012

(65) Prior Publication Data

US 2012/0159453 A1 Jun. 21, 2012

Related U.S. Application Data

(62) Division of application No. 12/191,713, filed on Aug. 14, 2008, now Pat. No. 8,312,428.

(30) Foreign Application Priority Data

Aug. 14, 2007 (CN) .......................... 2007 1 0141855

(51) Int. Cl.
*G06F 9/44* (2006.01)
*G06F 17/00* (2006.01)
*G06F 3/00* (2006.01)
*G06F 3/033* (2013.01)

(52) U.S. Cl.
USPC ........... 717/113; 717/120; 717/121; 715/209; 715/762; 715/863

(58) Field of Classification Search
None
See application file for complete search history.

(56) References Cited

U.S. PATENT DOCUMENTS

| | | | | |
|---|---|---|---|---|
| 5,701,444 A | * | 12/1997 | Baldwin | 345/506 |
| 5,781,720 A | * | 7/1998 | Parker et al. | 714/38.11 |
| 6,577,319 B1 | * | 6/2003 | Kashiwagi et al. | 345/581 |
| 6,907,546 B1 | * | 6/2005 | Haswell et al. | 714/38.11 |
| 7,030,890 B1 | * | 4/2006 | Jouet et al. | 345/619 |
| 7,653,896 B2 | * | 1/2010 | Herdeg, III | 717/113 |
| 7,898,529 B2 | * | 3/2011 | Fitzmaurice et al. | 345/173 |
| 8,079,037 B2 | * | 12/2011 | Lui et al. | 719/310 |
| 2002/0029259 A1 | * | 3/2002 | Okada | 709/219 |
| 2002/0033849 A1 | * | 3/2002 | Loppini et al. | 345/848 |
| 2004/0041837 A1 | * | 3/2004 | Yamaguchi et al. | 345/764 |
| 2004/0111696 A1 | * | 6/2004 | Soroker et al. | 717/101 |
| 2005/0289478 A1 | * | 12/2005 | Landman et al. | 715/804 |
| 2006/0005132 A1 | * | 1/2006 | Herdeg | 715/704 |
| 2007/0083813 A1 | * | 4/2007 | Lui et al. | 715/709 |
| 2007/0112714 A1 | * | 5/2007 | Fairweather | 706/46 |

(Continued)

*Primary Examiner* — Isaac Tecklu
(74) *Attorney, Agent, or Firm* — Steven M. Greenberg, Esq.; Carey, Rodriguez, Greenberg & O'Keefe

(57) ABSTRACT

A method for identifying GUI widgets of software are provided, comprising: during runtime of the software, determining a GUI window object and an ID thereof; determining all GUI widgets or all GUI widgets belonging to a same type in the GUI window object; partitioning the display area of the GUI window object into a plurality of areas such that each of the GUI widgets is uniquely contained in one area; specifying a unique ID for each area containing a GUI widget; and, identifying a GUI widget using the ID of the GUI window object and the ID of the area where the GUI widget resides, or the ID of the GUI window object, the ID of the type to which the GUI widget belongs and the ID of the area where the GUI widget resides, as the ID property of the GUI widget.

8 Claims, 9 Drawing Sheets

(56) References Cited

U.S. PATENT DOCUMENTS

| | | | |
|---|---|---|---|
| 2007/0162844 A1* | 7/2007 | Woodall et al. | 715/517 |
| 2007/0179987 A1* | 8/2007 | Lim | 707/200 |
| 2008/0163131 A1* | 7/2008 | Hirai et al. | 715/863 |
| 2009/0217187 A1* | 8/2009 | Kendall et al. | 715/765 |

* cited by examiner

METHOD TO RECOGNIZE GUI OBJECT IN GLOBALIZED ENVIRONMENT

CROSS-REFERENCE TO RELATED APPPLICATIONS

This application is a Divisional of U.S. application Ser. No. 12/191,713, filed Aug. 14, 2008, currently pending, which claims priority under 35 U.S.C. §119(a) to Chinese Patent Application Serial Number 200710141855.6, filed Aug. 14, 2007, entitled "METHOD TO RECOGNIZE GUI OBJECT IN GLOBALIZED ENVIRONMENT," the entirety of which are incorporated herein by reference.

TECHNICAL FIELD

The present invention relates to the computer field, particularly to automated testing of software, and more particularly to a method and apparatus for identifying graphical user interface (GUI) widgets of software.

BACKGROUND OF THE INVENTION

As is well known, software quality assurance (QA) is a very important part in the whole software development life-cycle due to its contribution to ensure software quality before the software being delivered to end users. However, most of its work has to be performed in a very primitive way. Many QA engineers have to click or input on the GUI widgets (even text-based interfaces) of the AUT (Application under test) manually and repeatedly. Especially in a globalization test environment, the workload of the QA engineers will be multiplied with the increase of the number of target languages of the AUT. This is the reason why there is such a great demand for the development of test automation technology.

However, so far, it is difficult to realize GUI test automation in a globalization environment with existing test automation technologies. Globalization is an important trend in the current software industry, since almost all software vendors are trying to extend their products to the worldwide market. In such a case, their products will be localized into different languages to meet the preferences of customer who may have different native languages. This poses a challenge to QA engineers. They have to verify functions of the software across multiple languages to ensure it can work in other language versions as in its base language version (e.g. English). With existing test automation technologies, QA engineers can develop test assets as expected on one language platform, e.g. English, but they will find those test scripts can not work on a platform based on another language. As a result, they have to execute the test scripts automatically on the base language platform, but test manually or re-create test scripts on other language platforms, although the different language versions of the AUT have the same functions and GUI widget layouts except only difference in their presentations caused by different language localizations. That is, test scripts created in a base language environment cannot be reused in other language environments, thus causing a lot of redundant efforts for creating and executing test scripts in multiple language environments respectively, as well as the waste of time, resource and cost.

Essentially, the real cause underlying this problem is the limitation of traditional GUI test automation technologies in GUI widget identification.

On one hand, in GUI test automation technologies, the common workflow is first to create test assets such as test scripts (in Java, or other languages) by recording or developing, and then to playback them in the end environment. Of these two phases, the first phase is more important, with its main task being to collect and store information on which GUI widgets are to be tested and their related logics, which GUI widgets and logics will necessarily be played back, in order to "tell" a runtime engine which and when GUI widgets need to invoke what logics such as clicks, double-clicks, etc. However, it is not easy to collect and store information on which GUI widgets are to be tested and their related logics, especially due to GUI widget identification. This is because, whatever method is used, a set of stable identification properties must be defined and determined.

On the other hand, the properties taken to identify GUI widgets in existing technologies, such as IBM's Rational Functional Tester, HP Mercury' Quick Test Professional, etc., are language-sensitive, which makes test scripts unable to work in a globalization environment. FIGS. 1 and 2 show an example of such a case. In the English environment shown in FIG. 1, the GUI control "Button" is identified by the language-sensitive property, "&Finish", while, in the Chinese environment shown in FIG. 2, the same GUI control is identified by the language-sensitive property, "完成 (&F)", which will cause the test scripts recorded and developed in the English environment cannot be reused in the Chinese environment, since a same GUI widget will be identified as different things in different language environments.

Therefore, there is need for a solution which can identify GUI widgets correctly, uniquely and stably across different language platforms by finding a language-independent identification property.

SUMMARY OF THE INVENTION

According to one aspect of the present invention, there is provided a method for identifying GUI widgets of software, comprising the steps of: during runtime of the software, determining a GUI window object and an identifier (ID) thereof; determining all GUI widgets or all GUI widgets belonging to a same type in the GUI window object; partitioning the display area of the GUI window object into a plurality of areas such that each of the GUI widgets is uniquely contained in one area; specifying a unique ID for each partitioned area containing a GUI widget; and, identifying a GUI widget using the ID of the GUI window object and the ID of the area where the GUI widget resides, or the ID of the GUI window object, the ID of the type to which the GUI widget belongs and the ID of the area where the GUI widget resides, as the ID property of the GUI widget.

According to another aspect of the present invention, there is provided a method for automated testing of software, comprising the steps of: in the playback phase of a test script, during the running of a second version of the software, reading the ID properties of the GUI widgets stored in the test script, wherein the ID properties of the GUI widgets were obtained by identifying the GUI widgets in a first version of the software using the above mentioned method; obtaining the ID properties of the GUI widgets in a second version of the software using the same identifying method as that for obtaining the ID properties of the GUI widgets in the test script; and, executing the test script with respect to the second version of the software according to the matching relationships between the read ID properties of the GUI widgets and the obtained ID properties of the GUI widgets in the second version of the software.

According to a still another aspect, there is provided an apparatus for identifying GUI widgets of software, comprising: GUI window object determining means for, during runtime of the software, determining a GUI window object and an ID thereof; GUI widget determining means for determining all GUI widgets or all GUI widgets belonging to a same type in the GUI window object; area partitioning means for partitioning the display area of the GUI window object into a plurality of areas such that each of the GUI widgets is uniquely contained in one area; area ID specifying means for specifying a unique ID for each partitioned area containing a GUI widget; and, GUI widget identifying means for identifying a GUI widget using the ID of the GUI window object and the ID of the area where the GUI widget resides, or the ID of the GUI window object, the ID of the type to which the GUI widget belongs and the ID of the area where the GUI widget resides, so as to obtain the ID property of the GUI widget.

According to a further aspect of the present invention, there is provided a system for automated testing of software, comprising a test script playback apparatus including: reading means for reading the ID properties of the GUI widgets stored in the test script, wherein the ID properties of the GUI widgets were obtained by identifying the GUI widgets in a first version of the software using the above mentioned method; the above mentioned apparatus for identifying GUI widgets of software, for, during runtime of a second version of the software, obtaining the ID properties of the GUI widgets in the software using the same identifying method as that for obtaining the ID properties of the GUI widgets in the test script; and, script executing means for executing the test script with respect to the second version of the software according to the matching relationships between the read ID properties of the GUI widgets and the obtained ID properties of the GUI widgets in the second version of the software.

BRIEF DESCRIPTION OF THE DRAWINGS

The attached claims describe novel features believed to be characteristic of the present invention. The invention itself, however, as well as its preferred mode of use, further objects and advantages can be best understood from the following detailed description of the illustrative embodiments when read in conjunction with the drawings, in which:

PREFERRED EMBODIMENTS OF THE INVENTION

Figure 1:
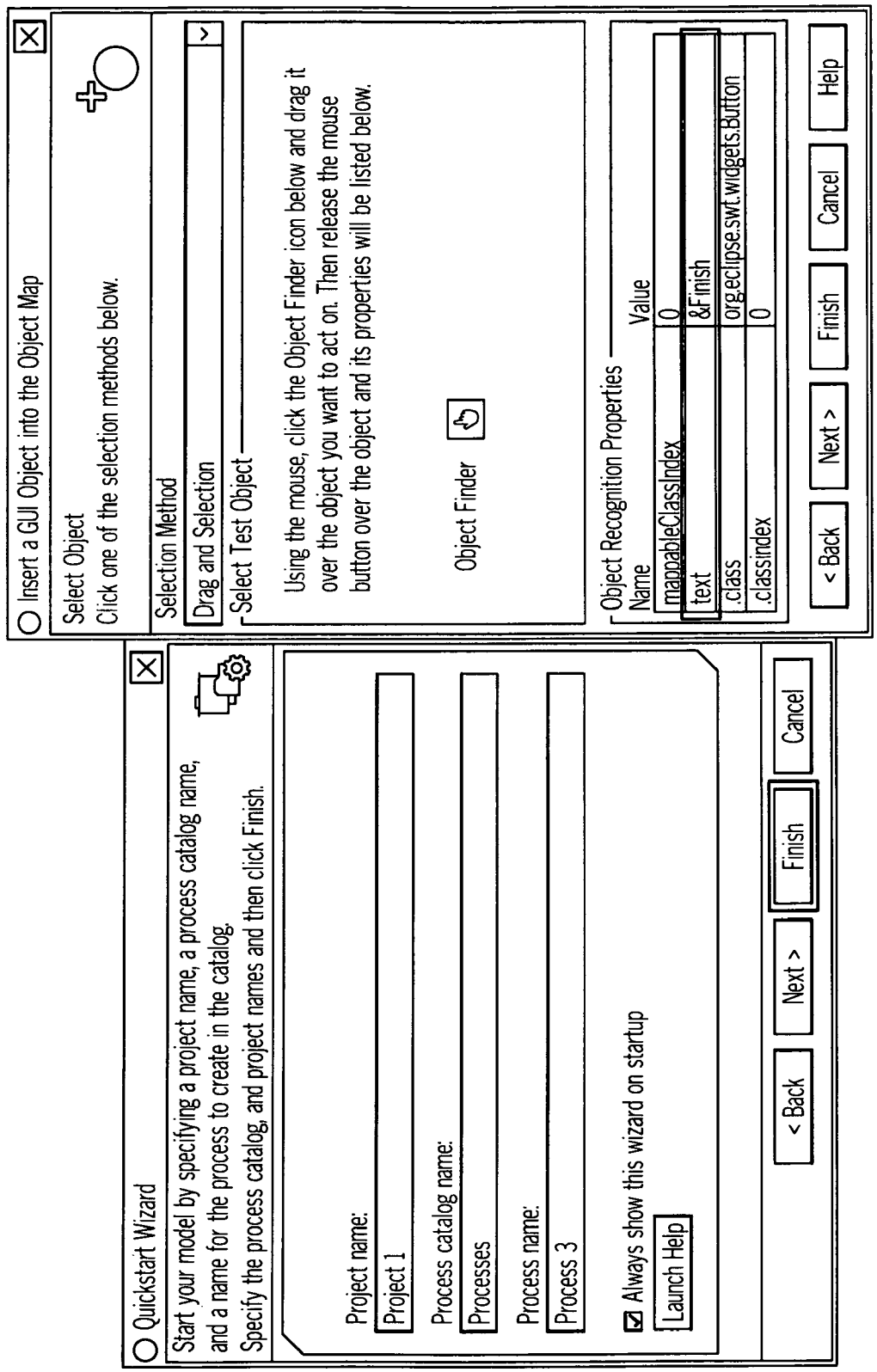
FIG. 1 shows a GUI window and GUI widgets identified in English therein in the English version of an exemplary application.
Figure 2:
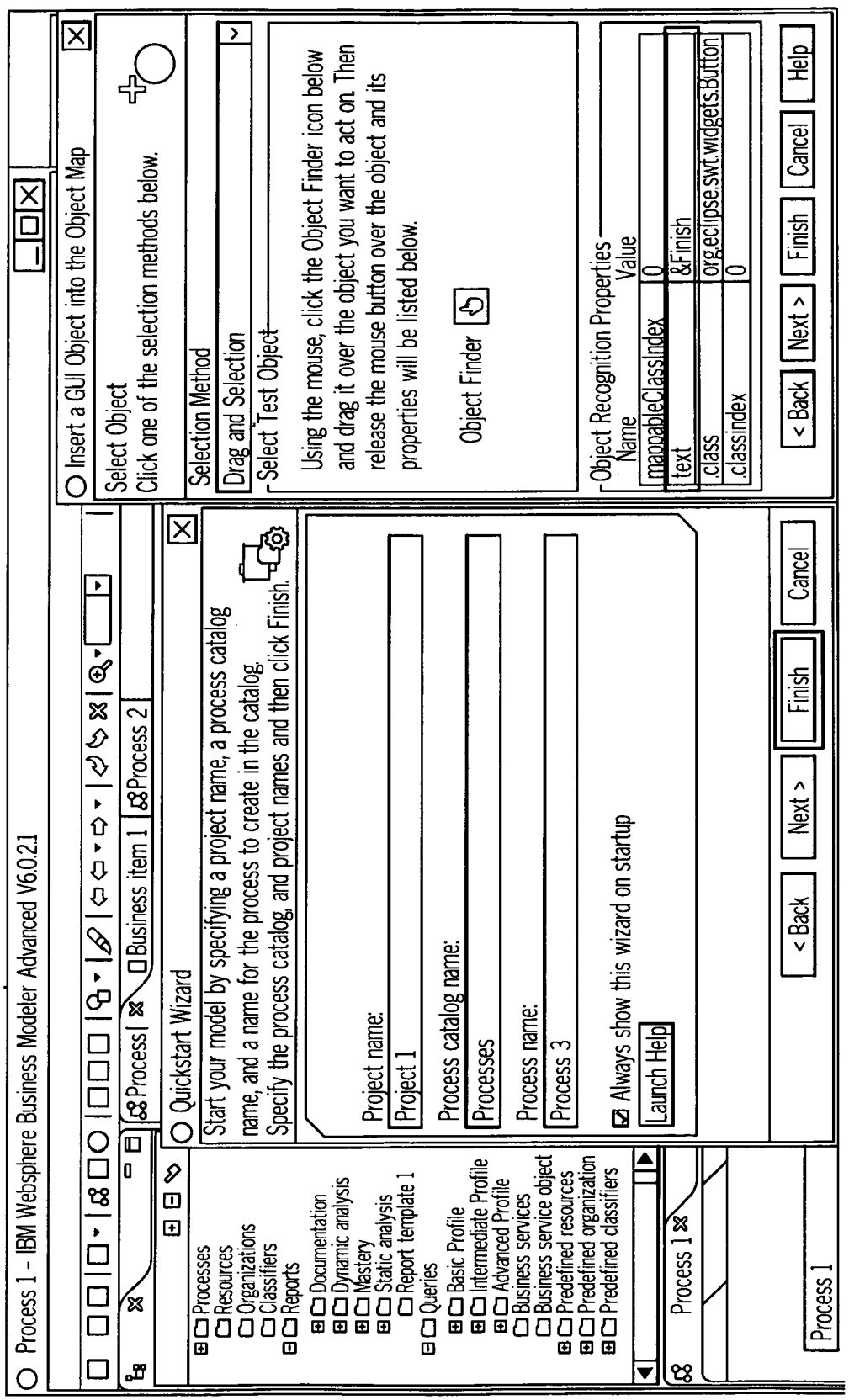
FIG. 2 shows a corresponding GUI window and GUI widgets identified in Chinese therein in the Chinese version of the exemplary application.

The embodiments of the present invention will be described hereinafter with reference to the drawing. However it should be understood that the present invention is not limited to the specific embodiments described herein. On the contrary, it is contemplated to implement and practice the present invention using an arbitrary combination of the following features and elements, regardless of whether they involve different embodiments. Therefore, the following aspects, features, embodiments and advantages are only for illustration and should not be regarded as elements or limitations of the attached claims, unless indicated explicitly in the claims. The reference to the features, advantages or similar language herein does not imply that all or certain features and elements that can be implemented using the present invention are in any single embodiment of the present invention. On the contrary, the language involving features and advantages should be understood as only meaning that the specific features, advantages and characteristics described in association with the embodiments are contained in at least one embodiment of the present invention.

The basic idea of the present invention is to define a set of language independent properties to identify GUI widgets. In the software under test, all the GUI widgets such as buttons, check boxes, list boxes, menus, text boxes, labels, etc. are within a GUI window object or part thereof such as a tab in the window. The layout of the window object, i.e., the relative positions of the various GUI widgets therein is stable, and will not change with the variation of the size of the window object. Further, between different language platforms, the layout will also not change generally. Otherwise, users of different language versions of same software will get different user experiences, which will be a defect in practice, and is not feasible.

Based on the above fact, the present invention partitions a GUI window object into a plurality of areas, making each GUI widget or a marking point of a GUI widget (such as its top left vertex) be uniquely contained in one area, and uses a unique ID (such as its number) of each area to identify the unique GUI widget in the area. Since the layout of the GUI window object is unchanged between different language versions of the software, which area each GUI widget belongs to is also unchanged between different language versions of the software. Thus the ID of the area to which each GUI widget belongs becomes the unique and stable ID for identifying the GUI widget between different language versions.

Figure 3:
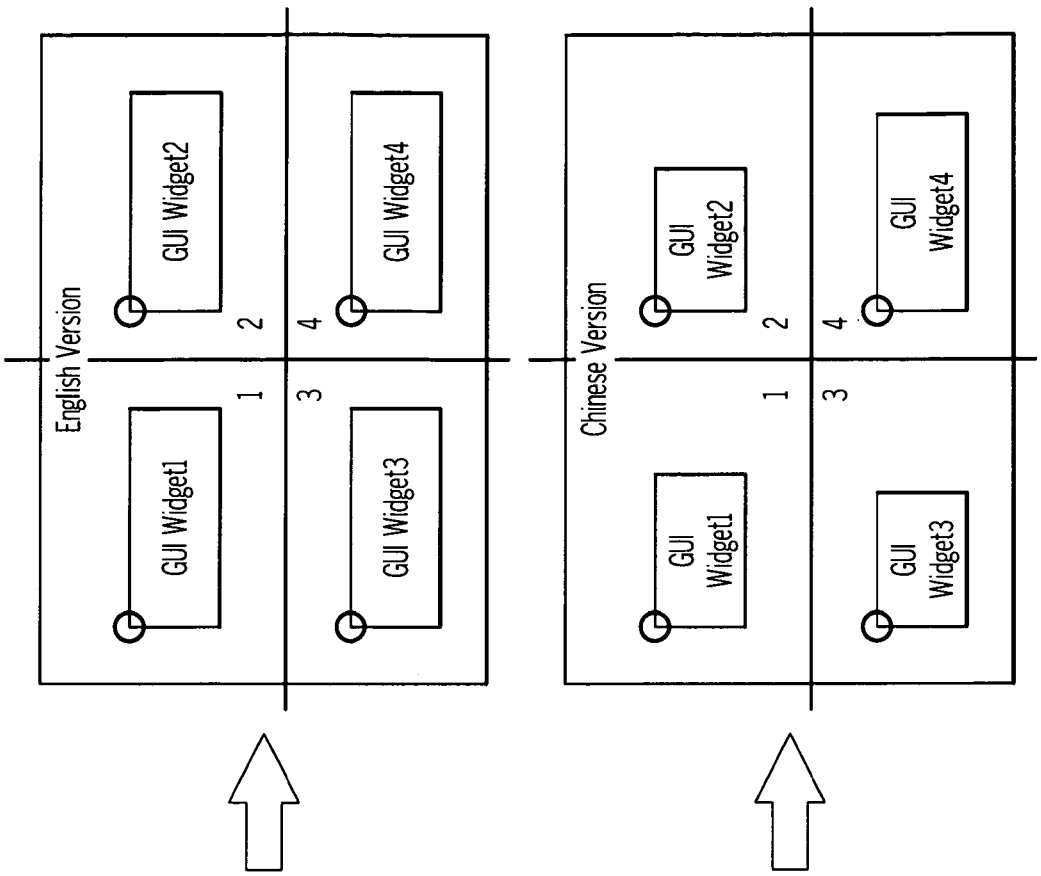
FIG. 3 illustrates a situation in which the layout of a GUI window object remains unchanged among different language versions.
Figure 3:
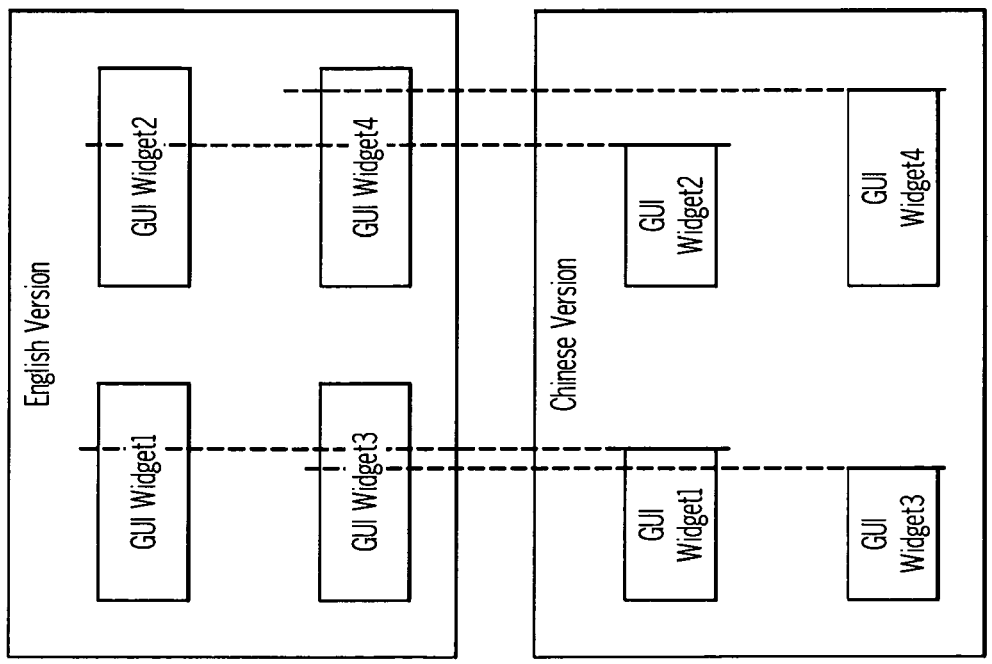

FIG. 3 illustrates a situation in which the layout of a GUI window object keeps unchanged between different language versions. The GUI window object contains four GUI widgets, i.e., GUI Widget1, GUI Widget2, GUI Widget3 and GUI Widget4. The four GUI widgets have slight differences in size and position between the English version and the Chinese version, respectively, but their relative positions in the two language versions are consistent. Therefore, when they are partitioned into different areas of the window by using the method according to the present invention so that each GUI widget is uniquely contained in one area, which area each GUI widget belongs to is unchanged between the two language versions. For example, GUI Widget1 belongs to area No. 1, GUI Widget2 belongs to area No. 2, GUI Widget3 belongs to area No. 3, and GUI Widget4 belongs to area No. 4. Thus, No. 1 can be used as a unique and stable ID property of GUI Widget1, No. 2 can be used as a unique and stable ID property of GUI Widget2, No. 3 can be used as a unique and stable ID property of GUI Widget3, and No. 4 can be used as a unique and stable ID property of GUI Widget4.

Figure 4:
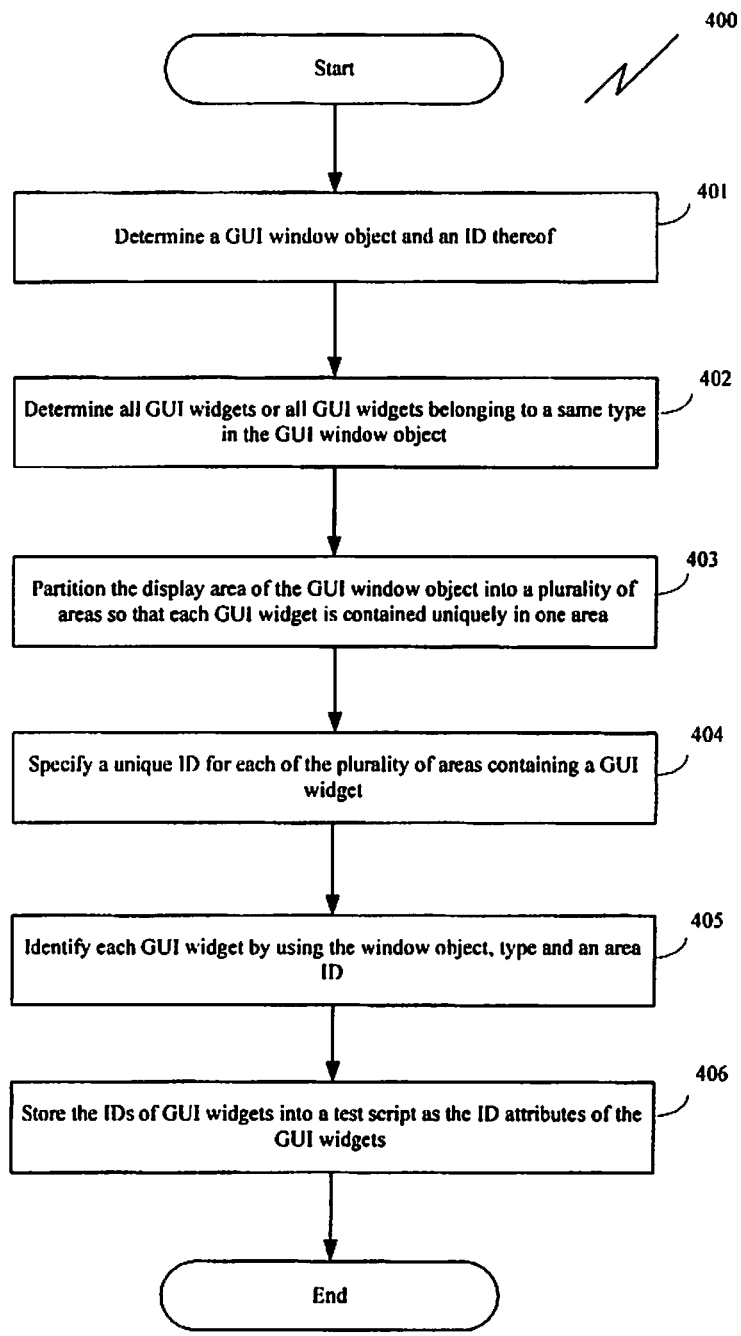
FIG. 4 shows a method for identifying GUI widgets according to an embodiment of the present invention.

The method for identifying GUI widgets of software according to an embodiment of the present invention will be described specifically hereinafter with respect to FIG. 4.

As shown in the figure, after the process starts, at step 401, the GUI window object and the ID thereof is determined. The GUI window object is, for example, a GUI window of the software under test or part of the GUI window such as a tab. The GUI object and the unique ID thereof can be determined by the scenario logic of the automated testing tool.

At step 402, all GUI widgets in the GUI window object or all GUI widgets of a same type are determined in the GUI window object. The type is, for example, the class to which a GUI widget belongs. For example, in software under test written in Java language, the class to which a GUI widget belongs can be determined through the .class property of the GUI widget. The type can also be some other stable category property of the GUI widget. In another embodiment of the present invention, instead of all GUI widgets belonging to a certain type, all GUI widgets in the GUI window object can also be determined directly. The GUI widgets determined in this step can be denoted as $Obj_i(i=1, \ldots, n)$.

At step 403, the display area of the GUI window object is partitioned into a plurality of areas such that each GUI widget is uniquely contained in one area. There are a lot of different methods for partitioning a display area of a GUI window object into a plurality of areas with each GUI widget uniquely contained in one area. For example, an X-Y rectangular coordinate system can be established by taking the left bottom vertex of the display area of the GUI window object as the origin (0, 0), and the coordinate of the top left vertex (or another vertex such as the top right vertex, etc.) of each GUI widget can be obtained, then the display area of the GUI window object can be partitioned into a plurality of areas so that the coordinate of the top left vertex of each GUI widget is uniquely contained in one area. For another example, a polar coordinate system can be built by taking the top left vertex of the display area of the GUI window object as the pole and taking the rightward horizontal line through the pole as the polar axis, and the polar coordinates of the top left vertex (or another vertex such as the top right vertex, etc.) of each GUI widget can be obtained, then the display area of the GUI window object can be partitioned into a plurality of areas so that the polar coordinates of the top left vertex of each GUI widget are uniquely contained in one area.

In an embodiment of the present invention using a rectangular coordinate system as shown in FIG. 3, for each GUI widget $Obj_i(i=1, \ldots, n)$ in n GUI widgets determined at step 402, the coordinates of its top left vertex in the rectangular coordinate system is determined as $(x_i, y_i)$. From the n abscissa coordinates $x_i(i=1, \ldots, n)$ of the n GUI widgets are obtained all the different abscissa coordinates, the total number of which is assumed to be m, and which are denoted as $x_j(j=1, \ldots, m, m \leq n)$. Similarly from the n ordinate coordinates $y_i(i=1, \ldots, n)$ of the n GUI widgets determined at step 402 are obtained all the different ordinate coordinates, the total number of which is assumed to be l, and which are denoted as $y_k(k=1, \ldots, l, l \leq n)$. Then between each pair of adjacent different abscissa coordinates $x_j$ and $x_{j+1}$ $(j=1, \ldots, m-1, m \leq n)$, e.g. at the coordinate point $((x_j+x_{j+1})/2, 0)$ $(j=1, \ldots, m-1, m \leq n)$, draw a perpendicular line in parallel with Y axis; and between each pair of adjacent different ordinate coordinates $y_k$ and $y_{k+1}(k=1, \ldots, l-1, l \leq n)$, e.g. at $(0, (y_k+y_{k+1})/2)$ $(k=1, \ldots, l-1, l \leq n)$, draw a horizontal line in parallel with X axis. Thus the display area of the GUI window object is partitioned into a l×m grid graph, with each GUI widget uniquely contained in one cell.

Figure 5:
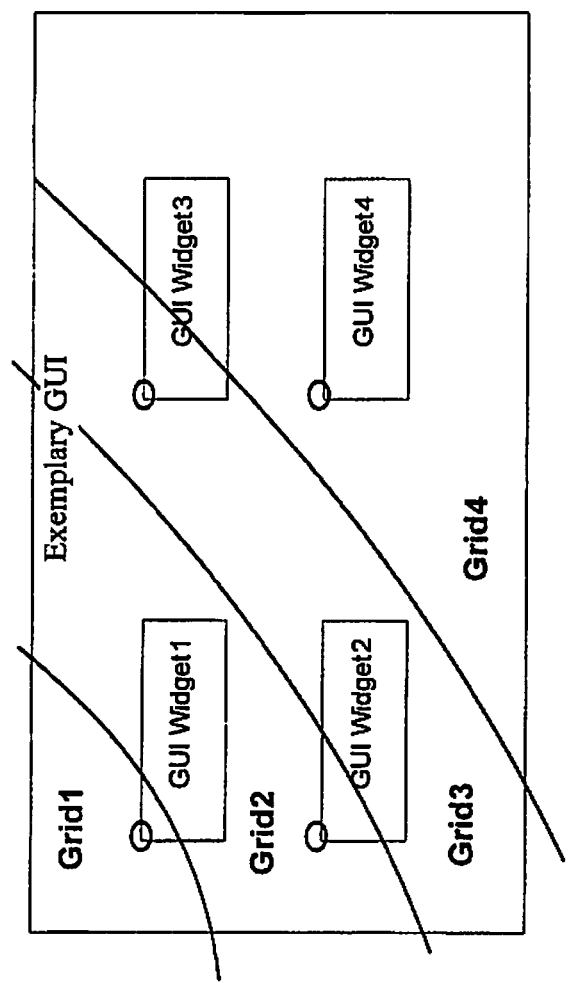
FIG. 5 illustrates an exemplary window of the software under test being partitioned using the method of the present invention according to an embodiment of the present invention so as to form a unique ID for each button in the window.

In another embodiment of the present invention using a polar coordinate system as shown in FIG. 5, for each GUI widget $Obj_i$ $(i=1, \ldots, n)$ in the n GUI widgets determined at step 402, the polar coordinates of its top left vertex in the polar coordinate system are determined to be $(\rho_i, \theta_i)$ $(i=1, \ldots, n)$, wherein $\rho_i$ denotes the distance from the top left vertex of the GUI widget $Obj_i$ to the pole, and $\theta_i$ denotes the angle between the line connecting the top left vertex of the GUI widget $Obj_i$ with the pole and the polar axis. From the n polar polar distances $\rho_i$ $(=1, \ldots, n)$ of the n GUI widgets are obtained all different polar distances, the total number of which are assumed to be m, denoted as $\rho_j$ $(j=1, \ldots, m, m \leq n)$. Then between each pair of adjacent polar distances $\rho_j$ and $\rho_{j+1}$ $(j=1, \ldots, m-1, m \leq n)$, e.g. at a distance of $(\rho_j+\rho_{j+1})/2$ $(j=1, \ldots, m-1, m \leq n)$ from the pole, an arc is drawn with the pole as the center of circle, thereby partitioning the display area of the GUI window object into m sector areas, each of which contains one or more GUI widgets.

Then, on each sector area containing more than one GUI widgets is performed the following operations: assuming the sector area contains l GUI widgets $Obj_k(k=1, \ldots, l \, l \leq n)$, the polar coordinates of which are $(\rho_a, \theta_k)$ $(k=1, \ldots, l, l \leq n)$ (the top left vertexes of these l GUI widgets have the same polar coordinate polar distance). Between each pair of adjacent polar angles $(\theta_k, \theta_{k+1})$ $(k=1, \ldots, l-1, l \leq n)$, e.g. at the polar angle $(\theta_k+\theta_{k+1})/2$, draw a straight line through the pole, thereby partitioning the sector area into l smaller sector areas, each of which contains one GUI widget. Through the above process, the display area of the GUI window object is partitioned into a plurality of sector areas or smaller sector areas, each of which contains only one GUI widget.

What is described above is only an example of the method for partitioning the display area of the GUI window object into a plurality of areas such that each GUI widget is uniquely contained in one area, and not a limitation to the method. For example, the origin of the rectangular coordinate system and the pole of the polar coordinate system can also at other positions, and the partitioning can be based on vertexes or positions other than the top left vertex of each GUI widget. In addition, other methods for partitioning the display area of a GUI window object can also be adopted.

At step 404, a unique ID is specified for each of the plurality of areas containing a GUI widget. Each partitioned area can be numbered sequentially (e.g., from top to bottom and from left to right) according to the positions of the partitioned areas, and the number can be taken as a unique ID of the area. A unique ID can be specified for each partitioned area or each partitioned area containing one GUI widget by any other way.

At step 405, each GUI widget is identified using the ID of the GUI window object and the ID of the area where the GUI widget resides, or the ID of the GUI window object, the ID of the type to which the GUI widget belongs, and the ID of the area where the GUI widget resides, thus obtaining the ID property of each GUI widget.

At optional step 406, the ID properties of the GUI widgets obtained at the identifying step are stored in a test script containing the GUI widget. Thus each GUI widget gets a unique ID property which is the same among different language versions of the software, the ID property containing the ID of the unique GUI window object where the GUI widget resides, which can be determined by a scenario logic, and the ID of the area where the GUI widget resides, such as its number, or containing the ID of the GUI window object where the GUI widget resides, the type to which the GUI widget belongs, such as its class or other stable properties, and the ID of the area where the GUI widget resides, such as its number, thus facilitating the generation and playback of a test script of same software on different language platforms and therefore facilitating testing of the software. Then, the process ends.

A method for identifying GUI widgets of software according to an embodiment of the present invention has been described above. It should be noted, however, that the described method is only an example, and not a limitation to the present invention. The method for identifying GUI widgets of software of the present invention can have more, less or different steps, some of the described steps can be combined into a single step or divided into smaller steps, and the order between some steps can vary or they can be performed in parallel.

Figure 6:
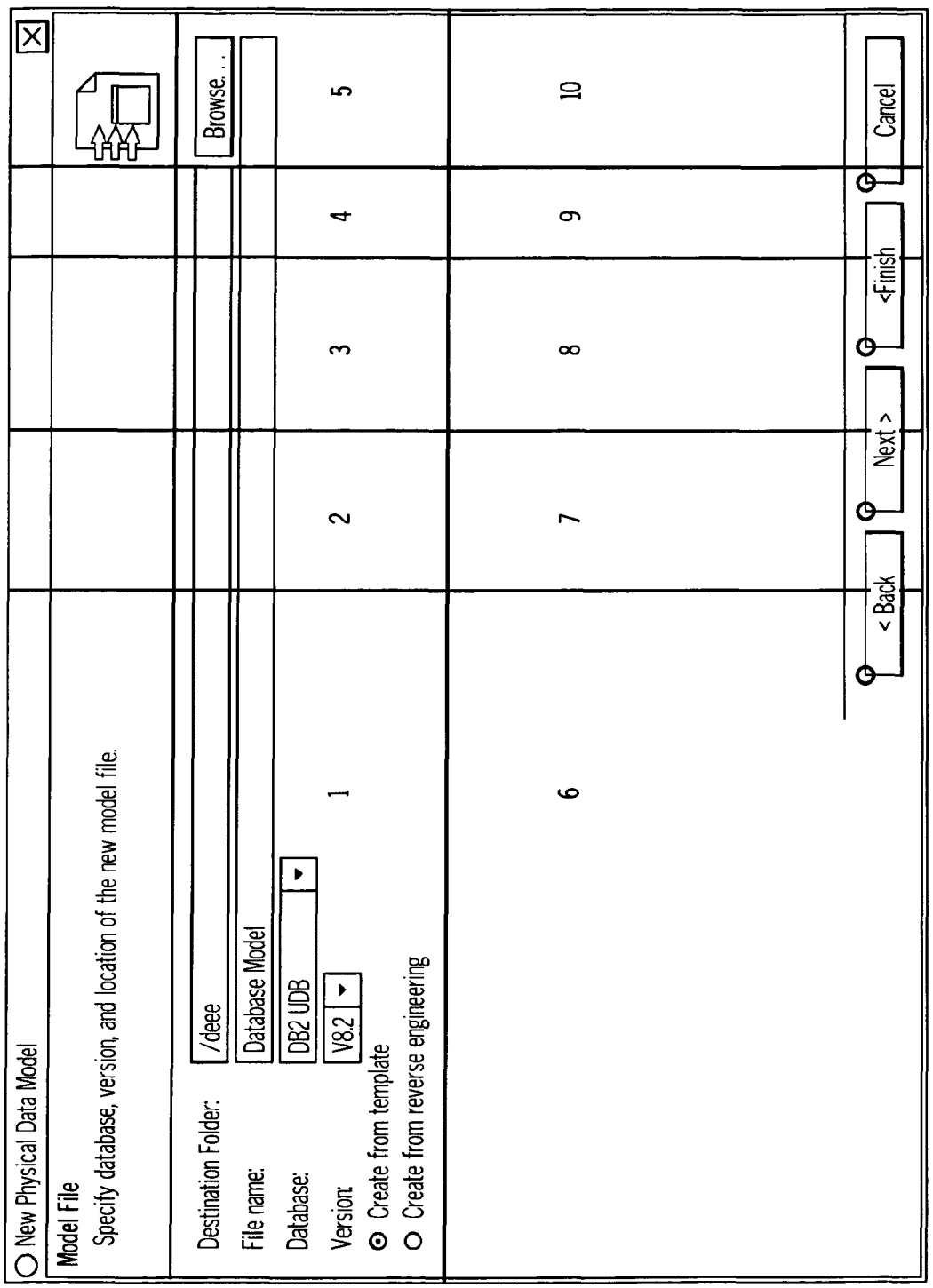
FIG. 6 illustrates an exemplary window of the software under test being partitioned using a method for partitioning a GUI window object according to a preferred embodiment of the present invention, so as to form a unique ID of each button in the window.

FIG. 6 shows an example of partitioning an exemplary window of software under test using a method for partitioning a GUI window object according to an embodiment of the present invention, thus forming a unique ID for each button in the window.

As shown in the figure, the window has 5 buttons: "Browse", "Back", "Next", "Finish" and "Cancel". The partitioning method according to an embodiment of the present invention partitions the display area of the window into 10 cells according the abscissa and ordinate coordinates of the top left vertexes of the 5 buttons, thus making each button uniquely residing in one cell. For example, the "Browse" button resides in the fifth cell, the "Back" button resides in the sixth cell, the "Next" button resides in the seventh cell, the "Finish" button resides in the eighth cell, and the "Cancel" button resides in the ninth cell. Thus a unique, language independent ID property of each button can be formed. For example, the unique ID properties of the "Browse" button and the "Next" button are as follows, respectively:

| "Browse" button | |
|---|---|
| Location | XXX GUI window object (unique in the software under test) |
| .class | org.eclipse.swt.widgets.Button |
| Area number | 5/10 |
| "Next" button | |
| Location | XXX GUI window object (unique in the software under test) |
| .class | org.eclipse.swt.widgets.Button |
| Area number | 7/10 |

Figure 7:
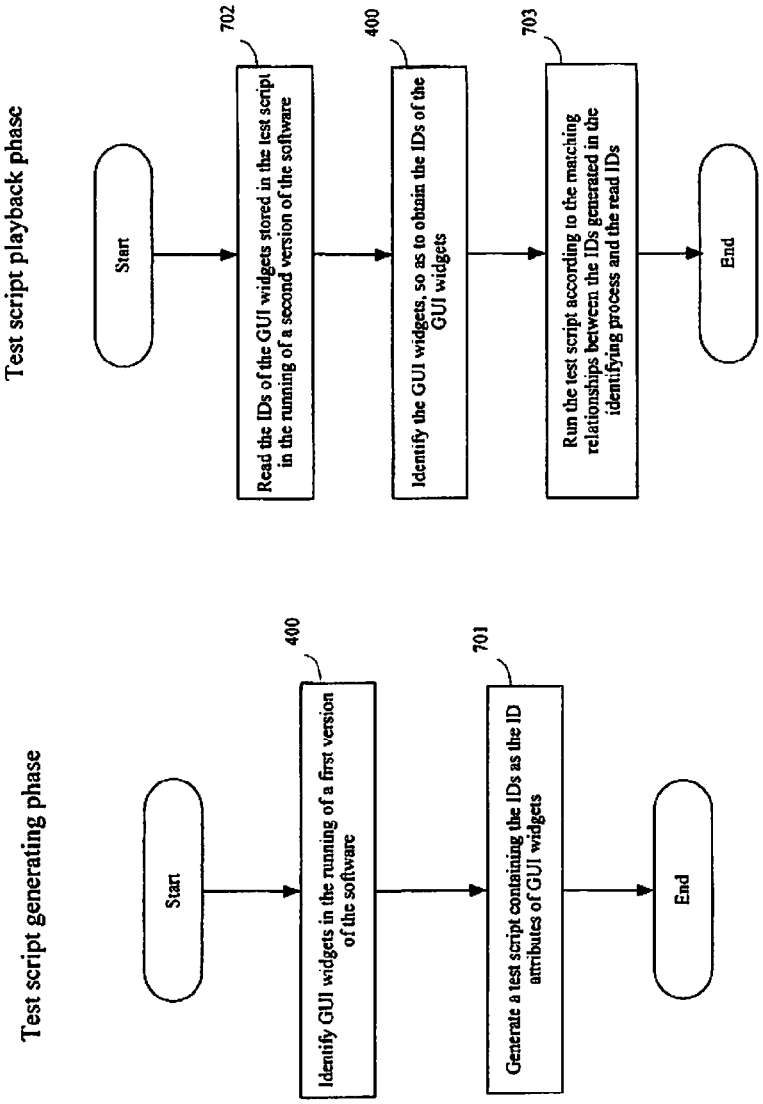
FIG. 7 shows a method for automated testing of software using the method for identifying GUI widgets according to the embodiment of the present invention.

In another aspect of the present invention, there is further provided a method for automated testing of software using the above mentioned method for identifying GUI widgets according to an embodiment of the present invention, as shown in FIG. 7. The method for automated testing of software includes a test script generation phase and a test script playback phase.

In the test script generation phase, after the process begins, during the running of a first version of the software, GUI widgets in the software are identified using the method 400 for identifying GUI widgets according to an embodiment of the present invention, thus obtaining the ID of each of the GUI widget, which is unique and remains unchanged among the various versions of the software. Then, at step 701, a test script containing the IDs as the ID properties of the GUI widgets is generated. The test script can be generated using any method as known to those skilled in the art, such as by recording the interactions between a tester and the software under test, manually writing the test script, or the combination thereof, etc. The generated test script can be expressed in any programming language or format as known to those skilled in the art. Then the process ends.

In the test script playback phase, after the process begins, at step 702, during the running of a second version (which may be identical to or different from the first version) of the software, the IDs of the GUI widgets stored in the test script are read, wherein the IDs of the GUI widgets stored in the test script are generated and stored with respect to the first version of the software in the test script generation phase as mentioned above. As long as the method for generating the IDs of the GUI widgets in another version of the software is identical to the method for generating the IDs of the GUI widgets in the first version of the software as stored in the test script, the IDs of the GUI widgets in the other version of the software will be identical to the ID s of the GUI widgets in the first version of the software as stored in the test script. Thus the IDs of the GUI widgets in the first version of the software in the test script will be applicable to all the other versions of the software. Accordingly, the GUI widgets in the second version of the software are identified using the same method for identifying the GUI widget in the first version of the software so as to generate the test script according to an embodiment of the present invention, thus obtaining the ID properties of the GUI widgets in the second version of the software. Then at step 703, the test script runs according to the matching relationships between the ID properties of the GUI widgets as read at step 702 and the ID property of each GUI widget in the second version of the software as obtained at the identifying step 400. That is, during the playback of the test script, for each GUI widget met in the test script, its ID property is read from the test script, and in the running of the second version of the software under test, its GUI widgets are identified, thus obtaining the ID property of each GUI widget in the second version of the software, and then the operations which the GUI widget in the test script have are performed on the GUI widget having the same ID property in the running of the second version of the software under test. The step 702 for reading the ID properties of the GUI widgets in the test script and the step for obtaining the ID properties of the GUI widgets of the second version of the software can be performed in any order or in parallel. In addition, either the ID property of each GUI widget in the test script is read first and the ID property of each GUI widget in the second version of the software is generated in the running of the second version of the software under test so as to find the matching relationships between them, or in the ruining of the test script, whenever an operation with respect to a GUI widget is performed, the ID property of the test script is read, the GUI widgets of the running software under test are identified, and the GUI widget having a matching ID property in the software under test is found, so as to perform the operations specified in the test script on the GUI widget. Then the process ends.

Figure 8:
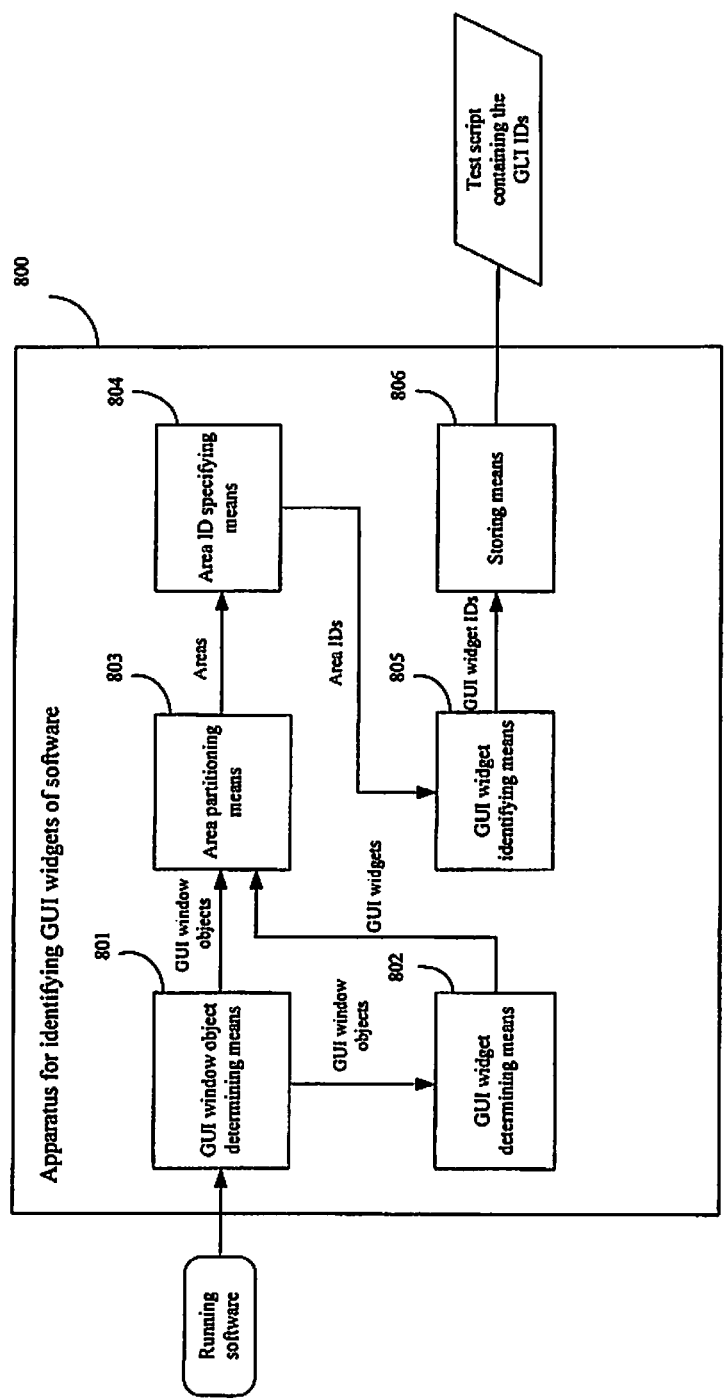
FIG. 8 shows an apparatus for identifying GUI widgets of software according to an embodiment of the present invention.

An apparatus 800 for identifying GUI widgets of software according to an embodiment of the present invention will be described hereinafter with reference to FIG. 8. As shown, the apparatus 800 comprises GUI window object determining means 801, GUI widget determining means 802, area partitioning means 803, area ID specifying means 804, GUI widget identifying means 805 and optional storing means 806.

The GUI window object determining means 801 is used to determine a GUI window object and an ID thereof in the running of the software. The GUI window object is a GUI window containing several GUI widgets or a part of the window such as a tab, etc., and its ID is unique in the software and remains unchanged in different language versions of the software.

The GUI widget determining means 802 is used to determine all the GUI widgets in the GUI window object or all the GUI widgets belonging to a same type. The type can be, for example, the class to which a GUI widget belongs or some other stable category property of the GUI widget.

The area partitioning means 803 is used to partition the display area of the GUI window object into a plurality of areas so that each GUI widget is uniquely contained in one area. The area partitioning means 803 can use a plurality of different methods to partition the display area of the GUI window object into a plurality of areas so that each GUI widget is uniquely contained in one area.

In one embodiment of the present invention, the area partitioning means 803 further comprises coordinate determining means and line drawing means, wherein the coordinate determining means is used to determine the abscissa and ordinate coordinate of a vertex of each of the GUI widgets in the display area of the GUI window object, and the line drawing means is used to draw a perpendicular line between any adjacent abscissa coordinates in the display area of the GUI window object, and draw a horizontal line between any adjacent ordinate coordinates in the display area of the GUI window object, so as to partition the display area of the GUI window object into a plurality of areas, wherein each GUI widget is uniquely contained in one area.

In another embodiment of the present invention, the area partitioning means 803 further comprises distance determining means, arc drawing means and radius drawing means, wherein the distance determining means is used to determine the distance from a vertex of each GUI widget to a vertex of the display area of the GUI window object; the arc drawing means is used to draw an arc by taking the vertex of the display area of the GUI window object as the center of circle and taking a distance between any adjacent distances as the radius, so as to partition the display area of the GUI window object into a plurality of areas; and the radius drawing means is used to, in case that any two or more GUI widgets are partitioned into a same arca, draw a radius between each pair of adjacent lines connecting the vertexes of the two or more GUI widgets with the vertexes of the display area of the GUI window object, to further partition the same area into a plurality of areas, so that each GUI widget is uniquely contained in one partitioned area.

The area ID specifying means 804 is used to specify a unique ID for each of the plurality of areas containing a GUI widget. The unique ID is, for example, the number of the arca.

The GUI widget identifying means 805 is used to identify a GUI widget using the ID of the GUI window object and the ID of the area where each GUI widget resides, or the ID of the GUI window object and the ID of the type to which each GUI widget belongs and the ID of the area where each GUI widget resides, so as to get the ID of each GUI widget.

The optional storing means 806 is used to store the obtained IDs of the GUI widgets into the test script containing the GUI widgets, as the ID properties of the GUI widgets.

The apparatus 800 for identifying GUI widgets of software according to an embodiment of the present invention has been described above. It should be noted, however, that the described apparatus 800 is only an example, and not limitation to the present invention. The apparatus for identifying GUI widgets of software of the present invention can have more, less or different functional modules than what is described; some of the described functional modules can be combined together, or divided further or have different connection relationships or containment relationships. All these variations are within the spirit and scope of the present invention.

Figure 9:
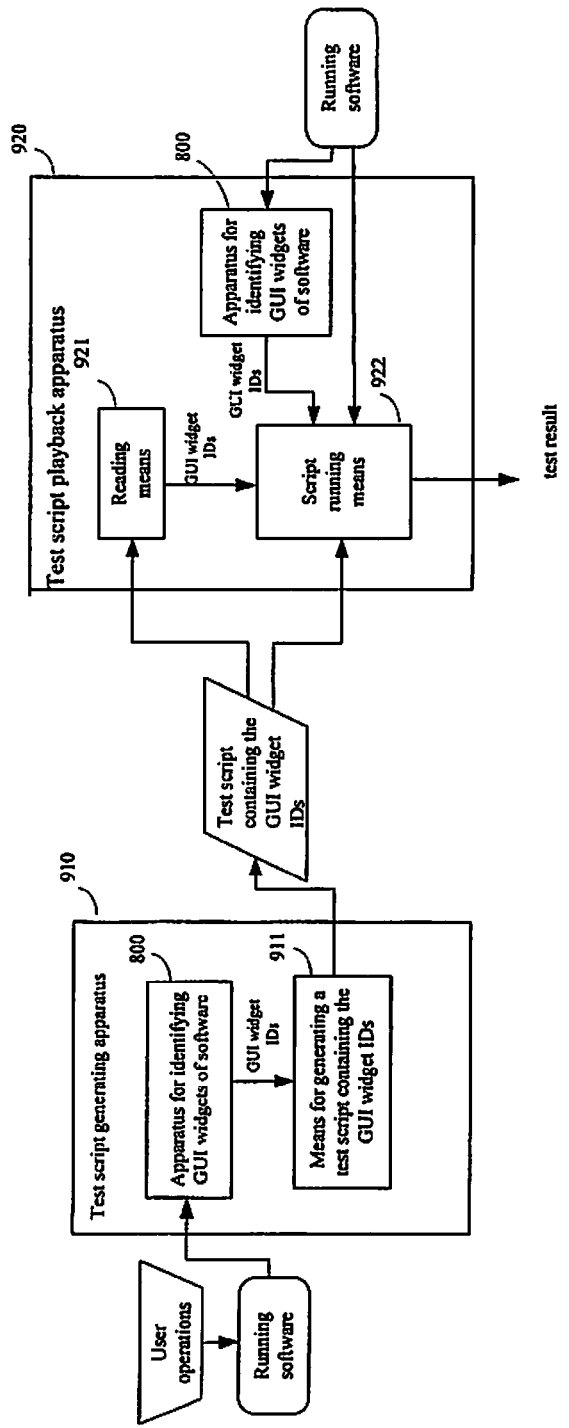
FIG. 9 shows a system for automated testing of software according to an embodiment of the present invention.

In another aspect of the present invention, there is further provided a system for automated testing of software as shown in FIG. 9, which system comprises test script generating apparatus 910 and test script playback apparatus 920.

The test script generating apparatus 910 comprises the apparatus 800 for identifying GUI widgets in software according to an embodiment of the present invention, and means 911 for generating a test script containing the ID properties of the GUI widgets.

The test script playback apparatus 920 comprises reading means 921, the apparatus 800 for identifying GUI widgets in software according to an embodiment of the present invention, and script running means 922.

During the running of the first version of the software, the apparatus 800 for identifying GUI widgets in software according to an embodiment of the present invention in the test script generating apparatus 910 identifies GUI widgets in the software, so as to obtain the ID property of each GUI widget which is unique and remains unchanged in various versions of the software. Then the means 911 for generating a test script containing the ID properties of GUI widgets generates a test script containing the ID properties of GUI widgets by recording the interactions between the tester and the software under test, manually writing the test script or a combination thereof, etc. The generated test script can be expressed in any programming language or format known to those skilled in the art. The means 911 for generating a test script containing the ID properties of GUI widgets can comprise any means for generating a test script known to those skilled in the art.

Then, during the running of a second version (which version may be identical to or different from the first version) such as a different language version of the software, the reading means 921 in the test script playback apparatus 920 reads the ID properties of the GUI widgets stored in the test script, wherein the ID properties of the GUI widgets stored in the test script are generated and stored with respect to the first version of the software in the generation phase of the test script as described above. In the meantime, or thereafter or therebefore, the apparatus 800 for identifying GUI widgets in software according to an embodiment of the present invention in the test script playback apparatus 920 identifies the GUI widgets in the second version of the software using the same identifying method as that for identifying the GUI widgets in the first version of the software to generate the test script, so as to obtain the ID properties of the GUI widgets in the second version of the software. Then the script running means 922 runs the test script according to the matching relationships between the ID properties of the GUI widgets read by the reading means 921 and the ID properties of the GUI widgets in the second version of the software obtained by the apparatus for identifying GUI widgets of software. That is, during the playback of the test script, for each GUI widget met in the test script, its ID property is read from the test script, and during the running of the second version of the software under test, its GUI widgets are identified so as to obtain the ID property of each GUI widget in the second version of the software, and then the operations which the GUI widget in the test script have arc performed on the GUI widget having the same ID property in the second version of the software under test. The script running means 922 can comprise any script running means known to those skilled in the art.

The present invention can be realized in hardware, software, firmware or a combination thereof. The present invention can be realized in a centralized fashion in one computer system or in a distributed fashion where, different elements are distributed in several interconnected computer systems.

Any kind of computer system or other apparatus adapted for carrying out the methods described herein is suited. A typical combination of hardware and software can be a general-purpose computer system with a computer program that, when being loaded and executed, controls the computer system such that it to execute the steps of the methods described herein, or constitute the functional modules in the apparatuses or systems according to embodiments of the present invention.

The present invention can also be embodied in a computer program product, which comprises all the features enabling the implementation of the methods described herein, and when being loaded into the computer system, is able to carry out these methods or constitute the functional modules in the apparatuses or systems according to embodiments of the present invention.

While the present invention is shown and described with respect to the preferred embodiments particularly, those skilled in the art can understand that various changes in form and detail can be made thereto without departing from the spirit and scope of the present invention.

The invention claimed is:

1. A method for identifying graphical user interface (GUI) widgets of software, comprising the steps of:
   during runtime of the software, determining a GUI window object and an identifier (ID) thereof;
   determining all GUI widgets or all GUI widgets bellowing to a same type in the GUI window object;
   partitioning the display area of the GUI window object into a plurality of areas such that each of the GUI widgets is uniquely contained in one area;
   specifying a unique ID for each portioned area containing a GUI widget; and,
   identifying a GUI widget using the ID of the GUI window object and the ID of the area where the GUI widget resides, or the ID of the GUI window object, the ID of the type to which the GUI widget belongs and the ID of the area where the GUI widget resides so as to get the ID property of the GUI widget.

2. The method according to claim 1, wherein the type is the class to which the GUI widget belongs.

3. The method according to claim 1, wherein partitioning the display area of the GUI window object into the plurality of areas such that each of the GUI widgets is uniquely contained in one area comprises the steps of:
   determining the abscissa and ordinate coordinates of a vertex of each GUI widget in the display area of the GUI window object;
   drawing a perpendicular line between any adjacent abscissa coordinates in the display area of the GUI window object, and
   drawing a horizontal line between any adjacent ordinate coordinates in the display area of the GUI window object, so as to partition the display area of the GUI window object into a plurality of areas, wherein each GUI widget is uniquely contained in one area.

4. The method according to claim 1, wherein partitioning the display area of the GUI window object into the plurality of areas such that each of the GUI widgets is uniquely contained in one area comprises the steps of:
   determining the distance from a vertex of each GUI widget to a vertex of the display area of the GUI window object;
   drawing an arc by taking the vertex of the display area of the GUI window object as the center of circle and taking a distance between any adjacent distances as the radius, so as to partition the display area of the GUI window object into a plurality of areas; and
   in case that any two or more GUI widgets are partitioned into a same area, drawing a radius between any adjacent lines connecting the vertexes of the two or more GUI widgets with the vertex of the display area of the GUI window object, to further partition the same area into a plurality of areas, so that each GUI widget is uniquely contained in one partitioned area.

5. The method according to claim 1, further comprising the steps of:
   storing the ID properties of the GUI widgets obtained in the indentifying step into a test script containing the GUI widgets.

6. A method of automated testing of software, comprising the steps of:
   in playback of a test script, during the running of a second version of software, reading identifier (ID) properties of graphical user interface (GUI) widgets stored in the test script, wherein the ID properties of GUI widgets are obtained by identifying the GUI widgets in a first version of software;
   obtaining the ID properties of GUI widgets in the second version of software using the same identifying method as that for obtaining the ID properties of GUI widgets in the test script; and,
   executing the test script with respect to the second version of software according to the matching relationships between the read ID properties of GUI widgets and the obtained ID properties of GUI widgets in the second version of software.

7. The method according to claim 6, further comprising a test script generating phase comprising the step of:
   obtaining the ID properties of GUI widgets in the first version of software; and
   generating the test script containing the ID properties of GUI widgets.

8. The method according to claim 6, wherein the first version and the second version of software are different versions or a same version in same or different languages.

* * * * *